Patented Dec. 22, 1953

2,663,689

UNITED STATES PATENT OFFICE 2,663,689

WELL TREATING SOLUTION

Benson M. Kingston and John B. Childress, Breckenridge, Tex., assignors to The Independent-Eastern Torpedo Company, a corporation of Ohio No Drawing. Application December 26, 1950, Serial No. 202,812

9 Claims. (Cl. 252—8.55)

This invention relates to a well washing and treating acid fluid, and in particular it relates to a fluid for removing drilling mud cakes from a well hole and for increasing the permeability of petroleum-bearing formations.

During the drilling operation of oil and gas wells, the drilling fluid which is circulated down and around the drill stem through the drilling bit for the purpose of removing drill cuttings, lubricating the bit, and equalizing formation pressures often plugs permeable strata which may produce petroleum. This fluid is normally composed of a suspension of very fine particles of the different geological formations the well has penetrated, together with specially prepared clays dispersed in water. The above-mentioned permeable strata are plugged by the finely divided particles being filtered from the fluid either at the face, or very near the face, of the well bore. The drilling fluid is usually termed "drilling mud" and the filtered solids termed "mud cake." When the aqueous filtrate from drilling mud penetrates certain petroleum-producing formations in which are interbedded colloidal anhydrous shales or clays of the bentonite type of minerals, these materials hydrate and swell seriously damaging the permeability of the formation and hampering the flow of fluids.

Heretofore, various fluids and methods have been proposed either to clean the mud cakes from a well or to increase the permeability of the earth formation and thereby increase the flow from the well, including fluoro-boric acid solution and other mixtures such as hydrochloric acid and a surface tension agent, and a mixture of hydrochloric acid and hydrofluoric acid.

The object of the present invention is the removal of drilling mud cake from the well bore and the area of porous rock immediately surrounding a well hole in permeable rock strata in order that the production of commercially valuable fluids may be permitted or increased. The removal of mud-cake is accomplished by treating the well bore and the area of porous rock immediately around it with an acid solution which will dissolve or disperse the fine particles of rock and clay comprising the cake and which will not deposit precipitates upon neutralization or when the mud-cake is removed.

It is also an object of this invention to improve the permeability of an earth formation containing a colloidal anhydrous shale or clay of the bentonite type which has been caused to swell by the aqueous filtrate from drilling mud by dissolving or dispersing the offending shale or clay.

It is another object of this invention to produce a treating fluid that will cleanse the surrounding strata of rock regardless of whether it is composed of carbonates, such as limestone or silicates, such as sandstone.

The solutions heretofore used for these purposes have been essentially hydrochloric acid with an inhibitor added to prevent corrosion of the drill stem or the casing.

In order to increase the permeability of earth formations where petroleum is usually found and therefore increase the petroleum flow to the well bore, fluorine compounds of various types, such as hydrofluoric acid, ammonium fluoride, and fluoro-boric acid, have been proposed. When a solution containing hydrochloric and hydrofluoric acids is used to treat calcareous formations in a well, calcium fluoride, an insoluble precipitate, is formed. When the same type solution is used to treat siliceous formations, gelatinous hydrofluorosilicic acid is precipitated when the solution is neutralized by the rock. These precipitations take place in the earth formations surrounding the well hole and have a tendency to clog the pores in the rock and decrease rather than increase the permeability of the formations treated. This has led to the failure of the solutions previously used and is overcome in the present invention by maintaining a buffered solution that will prevent the precipitation of these constituents.

The present invention is an improvement over these prior methods and solutions in that it produces all the beneficial results of the hydrochloric acid content in dissolving and improving the permeability of calcareous formations and also contains a fluorine compound capable of dissolving and removing certain shales and clays found in drilling muds and earth formations, and at the same time is buffered against depositing precipitates by the use of boric acid.

Preferably the present invention comprises a solution consisting principally of hydrochloric acid to which is added a definite amount of ammonium bi-fluoride which forms hydrofluoric acid. The solution also contains a small amount of boric acid, and a cationic surface active agent and a demulsifying compound may be added.

The hydrochloric acid component is the usual commercial mineral acid used to treat petroleum-producing earth formations in wells. It forms soluble salts of calcium and of other materials with which it reacts. Other acids have been tried and found unsatisfactory. Sulphuric acid will form calcium sulfate, a material that crystallizes from this solution and which renders its use unsatisfactory. Nitric acid may be used but has certain inherent disadvantages, the principal one being the cost of the material.

The hydrochloric acid acts as a carrier for the other ingredients in the solution and may vary in concentration from 2½% to 20% by weight, 15% being the acid concentration preferred in this composition.

Hydrofluoric acid is a necessary constituent of the composition comprising this invention, and for ease in handling the ammonium salt thereof is added to the hydrochloric acid solution in the proportion which will react with hydrochloric acid to give the desired concentration of hydrofluoric acid. The quantity of ammonium bi-fluoride preferred is 5.2% by weight, which will produce a concentration of approximately 3.2% hydrofluoric acid in the solution. Less than 1% has little or no effect, and it is not practical to use more than 10%.

A relatively small amount of boric acid is also added, sufficient to act as a buffer, to prevent the precipitation of reaction products when the acid solution has become spent. The preferred content of boric acid is 1 part to 3.2 parts of ammonium bi-fluoride. The maintenance of the right ratio is important because too great a proportion of the bi-fluoride will lessen the buffer effect of the boric acid which will lead to the formation of insoluble calcium bi-fluoride. An excessive amount of boric acid will make the bi-fluoride action ineffective towards silicate. It has been found that the optimum amount of boric acid is .6% to 3% with a concentration of 1.6% preferred. Similar buffer effects may be achieved through the use of salts of boric acid such as $Na_2B_4O_7 \cdot 10H_2O$ or others. It is preferred to use the acid for ease in handling and in making up the solution.

A surface active agent is also added for increasing activity of the process. This material aids in contacting the reactants at the bottom of the well hole; that is, it brings the acid into intimate contact with the earth formation and the drilling mud cake so as to promote the solution of the materials present. The surface active agent has the additional property of dispersing and causing the suspension of undissolved particles of the mud cake. The relative quantity of the surface active agent depends upon the agents used. BC is a high C-alkyl betaine made in accordance with Example 1 of U. S. Patent 2,129,264 in which in place of alpha bromo stearic acid, there is used a technical grade of alpha bromo stearic made from techanical stearic acid which is a mixture of stearic acid and palmitic acid. The final product is therefore a mixture of C-cetyl and C-myristyl betaines having cationic properties in an acid solution. The proportion has been determined to be 0.1% to 1.0% with 0.5% being the preferred amount. Other products which have been successfully employed in this process are Amasolv X 50 and A–509–R manufactured by Emery Industries Inc. The purpose of a suitable cationic surface tension agent is to provide a wetting agent and a dispersing agent to cause the suspension of the undissolved mud particles.

The demulsifying agent according to the invention is added to the solution to prevent or lessen the formation of an objectionable emulsion of the acid solution with crude oil from the rock strata being cleaned. Tretolite, a proprietary product of a dehydrating nature, is employed principally to prevent emulsions of this acid and oil. One to six gallons of Tretolite per 1000 gallons of acid solution produces satisfactory results, or a concentration of from .1% to .6% by weight. The preferred quantity is found to be .37% by weight. This product is made in accordance with Example IV of U. S. Patent 2,251,393, wherein the proportions of castor oil and triethylene tetramine used are 300 parts to 150 parts respectively, and is manufactured by the Tretolite Company, a division of Petrolite Corporation, Ltd., St. Louis, Missouri, and is sold under the trade name with the additional designation of L–16445. Other companies making similar dehydrating compounds which have proven satisfactory are the Aquanox Corporation, Houston, Texas, and the Visco Products Company, Sugarland, Texas.

An example of the above composition is:

| | Pounds |
|---|---|
| Hydrochloric acid 15, by weight | 92.33 |
| Ammonium bi-fluoride | 5.2 |
| Boric acid | 1.6 |
| Amasolv–X–50 | 0.5 |
| Tretolite | .37 |

All of these chemicals are used in one single solution, there being no attempt or necessity to introduce two chemicals which may be made to react within the well to produce a single reactant. The acid solution is easy to handle, is prepared in the oil fields in large quantities, taken to the well in trucks, and pumped directly from the trucks into wells.

This solution is used at atmospheric temperatures to treat petroleum wells immediately upon completion of drilling operations or when the production characteristics of a well indicate impaired permeability of the pay formation. The acid solution is pumped down a well through the tubing or drill stem after filling the hole with oil or water and washed by the formation into the annular space between the well casing and the tubing or drill stem, fluid being bled from the casing at the surface to make room for the acid. A portion of the solution is then forced into the earth formation by applying the necessary pressure with a pump to the annular space between the casing and the tubing or drill stem at the surface using either water or oil as a pressure medium. The solution is permitted to react for a short time, usually not longer than thirty minutes, and is then removed from the well and pay formation by flowing, swabbing, or pumping through the tubing or drill stem.

While we have described certain preferred embodiments of our invention, it will be understood that it is not intended that this invention be limited thereby, but that the invention may be otherwise embodied or practiced within the scope of the appended claims.

What is claimed is:

1. A well treating composition comprising an aqueous solution of hydrochloric acid of 2½% to 20% strength containing 1% to 10% hydrofluoric acid and a 0.6% to 3% buffering material selected from the group consisting of boric acid and water soluble salts of boric acid.

2. A well treating composition comprising an aqueous solution of hydrochloric acid of 2¼% to 20% strength containing 1% to 10% of hydrofluoric acid and 0.6% to 3% boric acid.

3. A well treating composition comprising an aqueous solution of hydrochloric acid of about 2½% to 20% acid concentration, a small amount of cationic surface active agent and a demulsifying agent, together with 1% to 10% of hydrofluoric acid and 0.6% to 3% boric acid.

4. A well treating composition comprising principally an aqueous solution of hydrochloric acid of about 15% acid concentration, 0.5% of a cationic surface active agent, 0.37% of a demulsifying agent, 1.6% of boric acid, and 5.2% of ammonium bi-fluoride.

5. The method of treating an oil well in a rock formation containing both carbonate and siliceous constituents which comprises introducing into the well a solution containing a major proportion of hydrochloric acid, a small amount of a cationic surface active agent, a small amount of a demulsifying agent, a minor proportion of hydrofluoric acid and an acidity maintaining buffering agent selected from the group consisting of boric acid and water soluble salts of boric acid, and thereafter withdrawing said solution and material in suspension therein.

6. A method of treating an oil well comprising introducing into the well a solution containing 2½% to 20% of hydrochloric acid, 0.1% to 0.6% of a demulsifying agent, 0.1% to 1% of a cationic surface active agent, 1% to 10% hydrofluoric acid, and an amount of 0.6% to 3% boric acid.

7. A method of treating an oil well comprising introducing into the well a solution containing 2½% to 20% of hydrochloric acid, 0.1% to 1% of a cationic surface active agent, 1% to 10% of hydrofluoric acid and an amount of 0.6% to 3% of boric acid.

8. A method of treating an oil well comprising introducing into the well a solution containing 2½% to 20% of hydrochloric acid, 1% to 10% of hydrofluoric acid and 0.6% to 3% of boric acid.

9. A method of treating an oil well comprising introducing into the well a solution containing 15% of hydrochloric acid, 5.2% of ammonium bi-fluoride, 1.6% of boric acid, 0.5% of a cationic surface active agent, and 0.37% of a demulsifying agent, and maintaining the solution in the well under pressure for a sufficient length of time to permeate the drilling mud and dissolve and suspend the solid constituents thereof, followed by removing the treating solution and dissolved and suspended matter from the well.

BENSON M. KINGSTON.
JOHN B. CHILDRESS.

References Cited in the file of this patent

UNITED STATES PATENTS

| Number | Name | Date |
|---|---|---|
| 2,094,479 | Vandergrift | Sept. 28, 1937 |
| 2,250,176 | Blair | July 22, 1941 |
| 2,251,393 | Blair | Aug. 5, 1941 |
| 2,265,759 | Lawton | Dec. 9, 1941 |
| 2,300,393 | Ayers | Nov. 3, 1942 |
| 2,314,022 | Stone | Mar. 16, 1943 |